United States Patent
Hayashi

(10) Patent No.: US 10,249,340 B2
(45) Date of Patent: Apr. 2, 2019

(54) VIDEO GENERATION DEVICE, VIDEO GENERATION PROGRAM, AND VIDEO GENERATION METHOD

(71) Applicant: Mitsuo Hayashi, Tokyo (JP)

(72) Inventor: Mitsuo Hayashi, Tokyo (JP)

(*) Notice: Subject to any disclaimer, the term of this patent is extended or adjusted under 35 U.S.C. 154(b) by 0 days.

(21) Appl. No.: 15/816,184

(22) Filed: Nov. 17, 2017

(65) Prior Publication Data

US 2018/0075880 A1    Mar. 15, 2018

Related U.S. Application Data

(62) Division of application No. 14/761,537, filed as application No. PCT/JP2013/000138 on Jan. 16, 2013, now Pat. No. 9,824,721.

(51) Int. Cl.

| | |
|---|---|
| *G11B 27/036* | (2006.01) |
| *H04N 21/472* | (2011.01) |
| *G11B 27/34* | (2006.01) |
| *G06K 9/00* | (2006.01) |

(52) U.S. Cl.
CPC ........ *G11B 27/036* (2013.01); *G06K 9/00402* (2013.01); *G06K 9/00671* (2013.01); *G11B 27/34* (2013.01); *H04N 21/47205* (2013.01)

(58) Field of Classification Search
USPC .......................... 386/239–248; 345/418–475
See application file for complete search history.

(56) References Cited

U.S. PATENT DOCUMENTS

| 5,579,456 A | 11/1996 | Cosman |
| 6,762,789 B1 * | 7/2004 | Sogabe ............... G06F 3/14 |
| | | 348/36 |
| 2010/0188409 A1 | 7/2010 | Ooba |
| 2013/0057540 A1 | 3/2013 | Winnemoeller et al. |

FOREIGN PATENT DOCUMENTS

WO    WO-2012/147303 A1    11/2012

* cited by examiner

*Primary Examiner* — Hung Q Dang
(74) *Attorney, Agent, or Firm* — Rabin & Berdo, P.C.

(57) ABSTRACT

It is an object of the invention to realize automatic video generation displaying in an easily understandable manner the state of brush stroke as effectively maintaining immersion feeling happened by looking-around operation during reproduction of the image production of an omnidirectional image. A stroke information group is associated with valid line-of-sight information from a reproduction sequence recording the line-of-sight information and the stroke information group. The number of frames between a pair of line-of-sight information is made constant. When the line-of-sight moves from a line-of-sight A via a line-of-sight B to a line-of-sight C, the stroke information group corresponding to the line-of-sight B is reproduced in a range from "a frame of a center between the line-of-sight information A and B" to "a frame of a center between the line-of-sight information B and C".

17 Claims, 7 Drawing Sheets

FIG. 5

|    | +0 | +1 | +2 | +3 | +4 | +5 | +6 | +7 | +8 | +9 |
|----|----|----|----|----|----|----|----|----|----|----|
| 0  | ■  | ■  | ■  | ▲  | ▲  | ▲  | ▲  | △  | ■  | ■  |
| 10 | ▲  | ▲  | ▲  | ▲  | ▲  | ▲  | ▲  | ▲  | ▲  | ▲  |
| 20 | ▲  | ▲  | △  | ■  | ■  | ■  | ■  | ▲  | ▲  | ▲  |
| 30 | ▲  | ▲  | ▲  | ▲  | ▲  | △  | ■  | ▲  | ▲  | ▲  |
| 40 | ▲  | △  |    |    |    |    |    |    |    |    |

FIG. 6

|    | +0 | +1 | +2 | +3 | +4 | +5 | +6 | +7 | +8 | +9 | +10 | +11 | +12 | +13 | +14 |
|----|----|----|----|----|----|----|----|----|----|----|-----|-----|-----|-----|-----|
| 0  | ■  | ■  | ■  | ▲  | ▲  | ▲  | ▲  | △  |    |    |     |     |     |     |     |
| 8  | ■  | ■  | ▲  | ▲  | ▲  | ▲  | ▲  | ▲  | ▲  | ▲  | ▲   | ▲   | ▲   | ▲   | △   |
| 23 | ■  | ■  | ■  | ■  | ▲  | ▲  | ▲  | ▲  | ▲  | ▲  | ▲   | △   |     |     |     |
| 36 | ■  | ▲  | ▲  | ▲  | ▲  | △  |    |    |    |    |     |     |     |     |     |

FIG. 7

| SEQUENCE NUMBER | TYPE | RELATION | ADDITION |
|-----------------|------|----------|----------|
| 0 ~ 1   | ■   | (WITHDRAWAL)       |                    |
| 2       | ■   | V[0]               |                    |
| 3 ~ 7   | ▲△  | S[0] ~ S[4]        | p[0]=0             |
| 8       | ■   | (WITHDRAWAL)       |                    |
| 9       | ■   | V[1]               |                    |
| 10 ~ 22 | ▲△  | S[5] ~ S[17]       | p[1]=5             |
| 23 ~ 25 | ■   | (WITHDRAWAL)       |                    |
| 26      | ■   | V[2]               |                    |
| 27 ~ 35 | ▲△  | S[18] ~ S[26]      | p[2]=18            |
| 36      | ■   | V[3]               |                    |
| 37 ~ 41 | ▲△  | S[27] ~ S[31]      | p[3]=27, p[4]=31+1 |

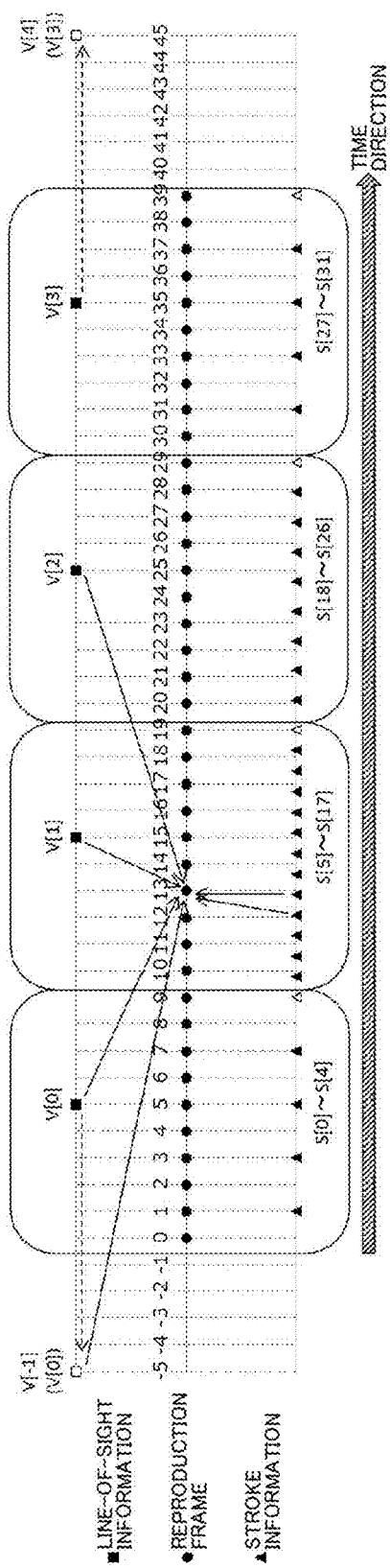

VIDEO GENERATION DEVICE, VIDEO GENERATION PROGRAM, AND VIDEO GENERATION METHOD

CROSS-REFERENCE TO THE RELATED APPLICATIONS

This is a divisional of U.S. application Ser. No. 14/761,537, filed on Jul. 16, 2015, and allowed on Jul. 19, 2017, which is, in turn, a national stage of PCT application number PCT/JP2013/000138, filed Jan. 16, 2013.

THE FIELD OF THE INVENTION

This invention relates to a video generation device, a video generation program, and a video generation method for generating a making video reproducing states of drawing using an omnidirectional image edition apparatus.

BACKGROUND OF RELATED ART

For example, when using an omnidirectional image edition apparatus (hereinafter, simply referred to as "omnidirectional image edition apparatus") as set forth in a prior application (see, Patent Document No. 1) filed by this applicant, a drawing operator completes an omnidirectional image by repeating steps of changing line of sight and steps of drawing. A stroke is made with a single line of sight continuously to some extent, while none of the line of sight moves during formation of the stroke. The term "omnidirectional image" means an image deemed as a background covering entire directions of the operator.

As a method automatically producing a making video from conventional pictures herein, exemplified are a method recording work screens, a method recording stroke information, etc.

The method recording work screens can reproduce a video clearly showing not only brush strokes but also entire work steps, because manipulations of graphical user interfaces (GUIs) used for work, enlarged indications as well as rotated indications of work product images accompanied with work are reproduced as they are. It is to be noted that a method increasing reproduction speed is frequently used with respect to the actual work time to reduce a time of the making video. For example, a sixty minute work state can be shortened to a reproduction of ten minutes by a sextuple speed.

On the other hand, the method recording stroke information allows producing a video presenting brush strokes while always displaying the entire image of the product, and also allows not displaying unnecessary information at all other than the brush strokes relating to the product image to be completed. It is to be noted that a method omitting time other than the brush strokes is frequently used with respect to the actual work time to reduce a time of the making video. For example, the reproduction time can be shortened by not reproducing such as, e.g., a time moving a pen from an end of a line to a subsequent starting point, and a time doing no manipulation.

As a one available method for producing the omnidirectional image as a two dimensional video displayable at a general flat display (e.g., liquid crystal display), a "looking-around video" can be exemplified.

The looking-around video is a generally familiar, natural video, as different from images of fisheye lens and panorama images, and is shown as a state always orienting some direction. That is, move of the line of sight is required to show the entire directions for the omnidirectional image.

Such a looking-around video may effectively hold immersion feeling as far as the line of sight moves smoothly. This is substantially the same as expectations that camera works such as, e.g., pan, tilt, and zoom, are to be done smoothly with such as, e.g., cameras used for actual photographing and virtual cameras used for computer graphics.

Patent Document No. 1: Gazette of International Publication No. WO/2012/147303

SUMMARY OF THE INVENTION

Problems to be Solved by the Invention

With the prior art method, however, no move of line of sight is done during the stroke. Accordingly, for example, if the stroke number for a single line of sight is enormous, the time not performing looking around is extended for a while. To the contrary, where the stroke number for a one line of sight is few or not existing, looking around may be done overly, and gives viewers dizzy feeling.

Move of the line of sight during the image production work is primarily aiming at not performing smoothly but performing brush strokes with new line or lines of sight, so that, in most cases, looking-around results in a distorted shape as a consequence that the move is reproduced as it is.

This invention is made in consideration of above mentioned technical problems, and it is an object of the invention to realize automatic video generation displaying in an easily understandable manner the state of brush stroke as effectively maintaining immersion feeling happened by looking-around operation during reproduction of the image production of an omnidirectional image.

Means for Solving the Problems

A video generation device according to a first aspect of the invention has a feature having: a memory unit for memorizing a video generation program; and a central control unit for making control, upon executing the video generation program memorized in the memory unit, to correspond a stroke information group to valid line-of-sight information from a reproduction sequence recording the line-of-sight information and the stroke information group, to render a frame number constant between a pair of line-of-sight information, and to reproduce, where the line-of-sight moves from a first line-of-sight via a second line-of-sight to a third line-of-sight, the stroke information group corresponding to the second line-of-sight in a range from a frame of a center between the first and second line-of-sight information to a frame of a center between the second and third line-of-sight information.

A video generation device according to a second aspect of the invention has a feature having: a memory unit for memorizing a video generation program; and a central control unit for making control to extract valid line-of-sight information included in a reproduction sequence upon executing the video generation program, to select a frame relating to the extracted line-of-sight information, to extract stroke information relating to the selected frame, to renew an omnidirectional image based on the line-of-sight information and drawing attribute where the stroke information includes the drawing attribute, to generate new line-of-sight information in an interpolated manner based on the extracted line-of-sight information, adjacent line-of-sight information, and the position of the extracted frame, upon completion of extraction of the entire stroke information relating to the selected frame, to make drawing the omnidirectional image on a screen image based on the interpolated line-of-sight information, and to write the screen image as an image of the selected frame.

A video generation program according to a third aspect of the invention has a feature making a computer functioning as a central control unit controlling, where executing the video generation program memorized in a memory unit, to correspond a stroke information group to valid line-of-sight information from a reproduction sequence recording the line-of-sight information and the stroke information group, to render a frame number constant between a pair of line-of-sight information, and to reproduce, where the line-of-sight moves from a first line-of-sight via a second line-of-sight to a third line-of-sight, the stroke information group corresponding to the second line-of-sight in a range from a frame of a center between the first and second line-of-sight information to a frame of a center between the second and third line-of-sight information.

A video generation program according to a fourth aspect of the invention has a feature making a computer functioning as a central control unit controlling to execute, as a step of executing the video generation program memorized in a memory unit, the steps of: extracting valid line-of-sight information included in a reproduction sequence upon executing the video generation program; selecting a frame relating to the extracted line-of-sight information, to extract stroke information relating to the selected frame; renewing an omnidirectional image based on the line-of-sight information and drawing attribute where the stroke information includes the drawing attribute; generating new line-of-sight information in an interpolated manner based on the extracted line-of-sight information, adjacent line-of-sight information, and the position of the extracted frame, upon completion of extraction of the entire stroke information relating to the selected frame; making drawing the omnidirectional image on a screen image based on the interpolated line-of-sight information; and writing the screen image as an image of the selected frame.

A video generation method according to a fifth aspect of the invention has a feature rendering a central control unit execute a video generation program memorized in a memory unit, to correspond a stroke information group to valid line-of-sight information from a reproduction sequence recording the line-of-sight information and the stroke information group, to render a frame number constant between a pair of line-of-sight information, and to reproduce, where the line-of-sight moves from a first line-of-sight via a second line-of-sight to a third line-of-sight, the stroke information group corresponding to the second line-of-sight in a range from a frame of a center between the first and second line-of-sight information to a frame of a center between the second and third line-of-sight information.

A video generation method according to a sixth aspect of the invention has a feature rendering a central control unit execute a video generation program memorized in a memory unit as a step, for executing the steps of: extracting valid line-of-sight information included in a reproduction sequence upon executing the video generation program; selecting a frame relating to the extracted line-of-sight information, to extract stroke information relating to the selected frame; renewing an omnidirectional image based on the line-of-sight information and drawing attribute where the stroke information includes the drawing attribute; generating new line-of-sight information in an interpolated manner based on the extracted line-of-sight information, adjacent line-of-sight information, and the position of the extracted frame, upon completion of extraction of the entire stroke information relating to the selected frame; making drawing the omnidirectional image on a screen image based on the interpolated line-of-sight information; and writing the screen image as an image of the selected frame.

Advantages of the Invention

According to the invention, the video generation device, the video generation program, and the video generation method can be provided in realizing automatic video generation displaying in an easily understandable manner the state of brush stroke as effectively maintaining immersion feeling happened by looking-around operation during reproduction of the image production of an omnidirectional image.

BRIEF DESCRIPTION OF THE DRAWINGS

FIG. 5 is a diagram showing an example of a reproduction sequence;

FIG. 6 is a diagram showing a concept dividing the reproduction sequence into groups;

FIG. 7 is a table showing a concept of relationship of the reproduction sequence;

FIG. 8 is diagram showing an example of an arrangement of reproduction sequence and reproduction frames in chronological order.

DETAILED DESCRIPTION OF EMBODIMENTS

Figure 1:
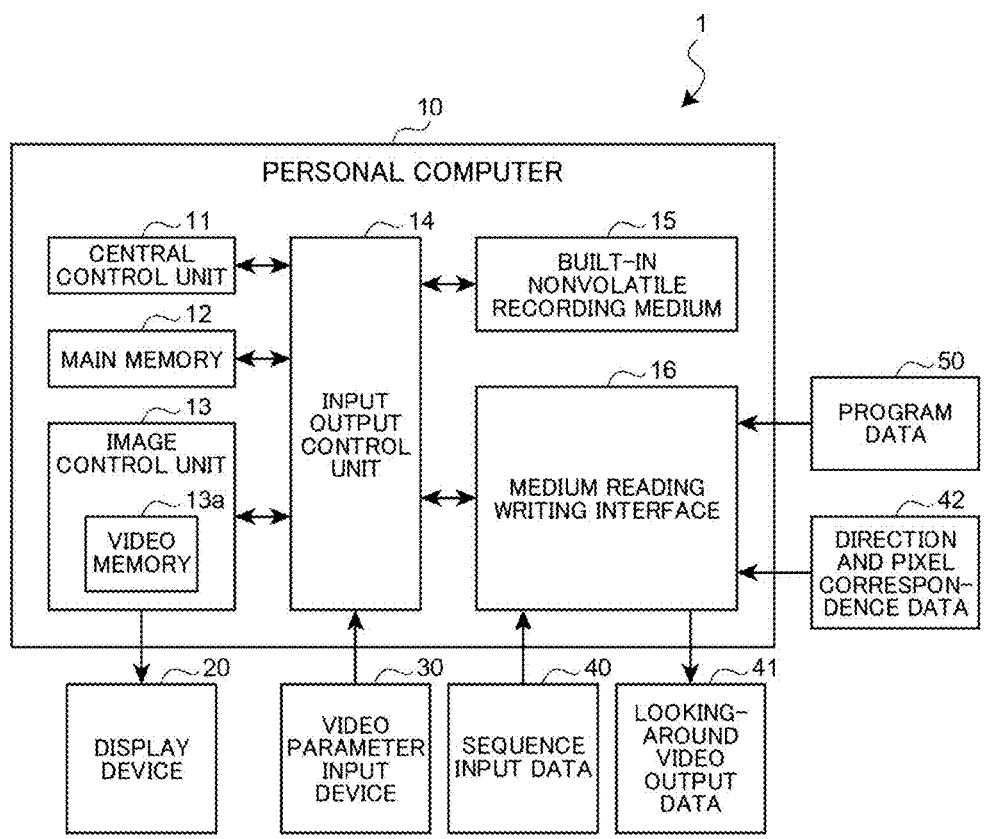
FIG. 1 is a diagram showing a structure of a video generation device according to an embodiment of the invention.

Hereinafter, referring to the drawings, preferred embodiments according to a video generation device, a video generation program, and a video generation method of the invention are described. It is to be noted that the video generation device, the video generation program, and the video generation method of the invention, are not limited to the following description but may be modifiable in a suitable manner as far as not deviated from the subject matter of the invention. Details are follows:

FIG. 1 illustrates a structure of a video generation device according to the embodiment of the invention.

As shown in FIG. 1, the video generation device 1 includes a personal computer 10, a display device 20, a video parameter input device 30, etc.

The personal computer 10 includes a central control unit 11 made of a multitask processor, a main memory 12 made of a RAM (Random Access Memory) as a temporarily storage device, an image control unit 13 such as a graphic card, an input output control unit 14, a built-in nonvolatile recording medium 15, and a medium reading writing interface 16.

The image control unit 13 includes a video memory 13a. The video memory 13a is a location temporarily storing data in the same way as the main memory 12 in the main body of the personal computer 10, and a memory attached to the graphic card can be referred to as VRAM (video RAM). Where a 3D graphic image is displayed on the screen, the data amount necessary at that time becomes large. The data completing the processing at the image control unit 13 are stored in the video memory 13a and used as required. The more the video memory has the capacity, the more images are smoothly displayed with no failure even for fine 3D graphic images. It is to be noted that VRAMs are advancing with higher speed these days, that some memory standard specialized for high speed processing so-called GDDR (Graphic DDR) appears in market, and that high speed transmission of huge data is realized for three-dimensional graphic drawing.

The display device 20 is a device represented by such as, e.g., liquid crystal display, capable of displaying images. The video parameter input device 30 is a device rendering a user arbitrarily designate adjustments (e.g., line-of-sight information, reproduction speed, adjustment of image qualities) relating to looking-around video output data 41, and is a device capable of coordinate inputting and/or button inputting, as represented by mouse, touch panel, and pen tablet, and a device allowing key entry as represented by keyboard.

Program data 50, direction and pixel correspondence data 42, and sequence input data 40 are inputted to the personal computer 10 via the medium reading writing interface 16, and the looking-around video output data 41 are outputted to an exterior from the personal computer 10 via the medium reading writing interface 16.

The program data 50 are meaning software operable with this invention. Data of the video generation program or the like correspond to these.

The direction and pixel correspondence data 42 are meaning a table or function corresponding between the direction and the position of pixels mutually. In a situation that a polygon model is used, this corresponds to polygon model data and becomes an object in a three-dimensional shape. The direction and pixel correspondence data 42 may be accompanied with the program data 50 and may be made by retrieving data defined externally.

The sequence input data 40 are data handled with software, are data sequentially recording manipulations for drawing in the omnidirectional image edition apparatus, and are used as a reproduction sequence as described below. The inputted data are memorized temporally in the main memory 12. The looking-around video output data 41 are image groups handled by the software, and are outputted as continuous images, or namely, video data.

The direction and pixel correspondence data 42 and the program data 50 may be read from an external recording medium not shown or may be received with a communication controller not shown from an external computer via a communication network to be stored in the built-in nonvolatile recording medium 15 via the input output control unit 14. The looking-around video output data 41 may be written in an external recording medium not shown or may be transmitted to an external computer not shown via the communication network.

Figure 2:
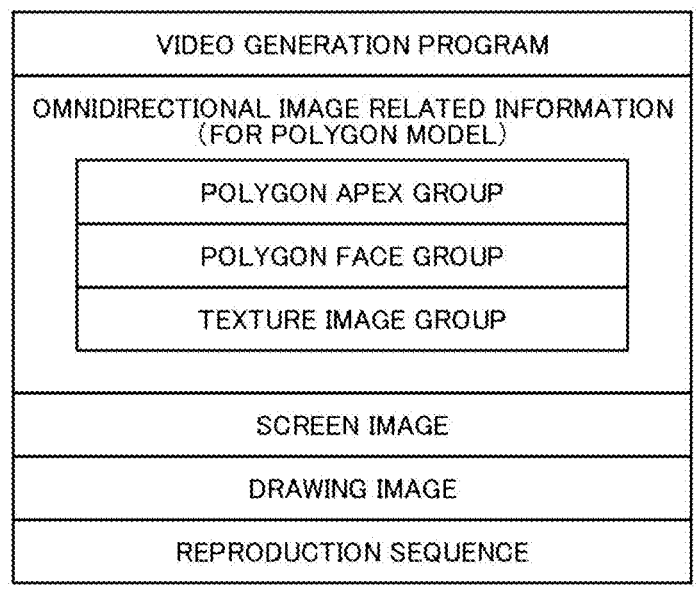
FIG. 2 is a diagram showing a memory map of a main memory used for video generation.

FIG. 2 shows a memory map of the main memory 12 used for video generation.

Each image has color information with opacity (a: alpha, r: red, g: green, b: blue) as two-dimensional arrangement. The term "alpha" indicates opacity information. In the personal computer, the color information of one pixel is recorded on a basis of 24 bits (8 bits per one color, three colors of red, green, and blue result 8×3=24 bits). Eight bits bring a recording of 256 grayscale. PNG data with alpha (32 bits PNG; 32 bit Portable Network Graphics) allow, in addition to the color information, a recording of the opacity of each pixel with 8 bits, 256 grayscale. If the alpha value is zero, it means completely transparent, and if the value is 255, it means completely not transparent.

Omnidirectional image related information means information showing a background covering entire directions of drawers of the omnidirectional image edition apparatus and viewers of the invention, or showing namely the omnidirectional images. FIG. 2 is an example for a situation particularly utilizing a polygon model. Polygon apex includes three-dimensional space coordinates (x: horizon, y: vertical, z: depth) and two-dimensional texture coordinates (u: horizon, v: vertical). Polygon face includes, to show a triangle, three references to the polygon apexes, and references to the texture images of a number of the layers. The polygon model includes, to show a three dimensional shape, the polygon apexes and the polygon faces, respectively as arrangements. Where the structure of the texture group owned by a single layer is the same to that of any layer, the reference to the texture image can be a single relative reference within the layer.

The screen image is meaning an image projected to a two-dimensional coordinate plane with a coordinate conversion from an omnidirectional image and presented to the drawer by means of the display device 20, or an image of one frame outputted as the looking-around video output data 41. In this invention, the renewal process of the omnidirectional images is mainly projected to a screen image, and is presented to viewers.

Drawing is a work writing figures and lines to two-dimensional (planer) image using mainly a pointing device with the omnidirectional image edition apparatus. Drawing image or image for drawing is meaning a two-dimensional (planer) image as a target which the drawer makes drawing actually. The drawing image is stored in a memory area other than that for the screen image, has the same coordinate system as the screen image, and is in a completely transparent state before start of drawing. The portions that the drawing is made are subject to renewals of the opaque information and color information. This is equivalent to doing drawing to a transparent layer overlapping a screen image by the drawer. As a method for drawing, exemplified are, such as, e.g., free hand, straight line, curve, rectangular, circle, and paste of image. Attributes of drawing may be considered as width and color where the method is for a line and considered as pattern of painting where the method is for a figure. In this invention, drawing is automatically done according to a reproduction sequence as described below.

It is to be noted that the drawing image is a temporary image until reflecting the contents of the drawing to the omnidirectional image, and may be used when necessary. For example, the drawing image may not be used, where the drawing contents are reflected immediately to the omnidirectional image as a drawing rule, without requiring to go back to the line-of-sight change mode again (or namely, modify the line of sight) before the end of drawing during the drawing.

The reproduction sequence is meaning data sequentially recording the manipulations of the drawing in the omnidirectional image edition apparatus, as information, and is used for renewal of omnidirectional images in this invention.

Figure 3A:
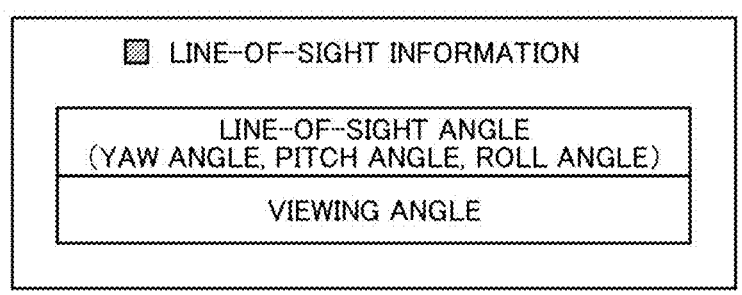
FIG. 3A and FIG. 3B are diagrams showing kind and structure of information recorded in a reproduction sequence.
Figure 3B:
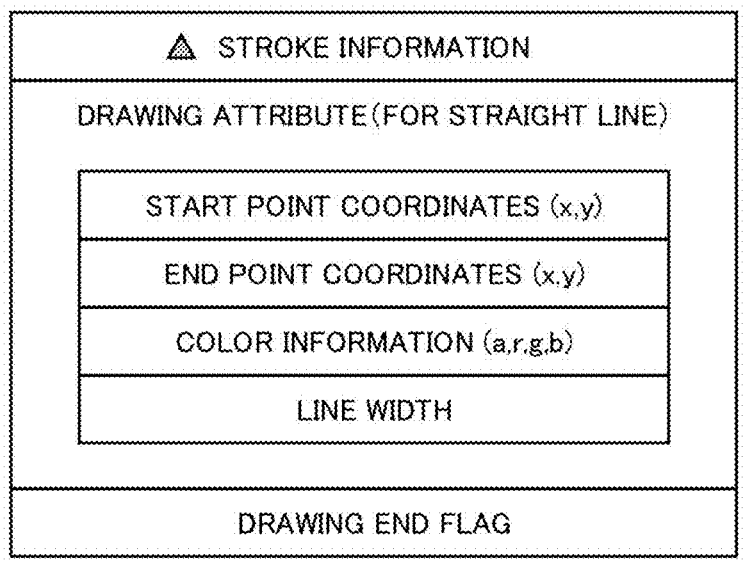

Hereinafter, FIG. 3A and FIG. 3B show kind and structure of information recorded in the reproduction sequence, which is described in detail.

The information as element of the reproduction sequence is at least two types, mainly, line-of-sight information and stroke information.

The line-of-sight information includes mainly line-of-sight angle (yaw angle, pitch angle, and roll angle) and viewing angle. In addition, the line-of-sight information may include shifting amount (horizontal shift, vertical shift). Shifting is a method parallel moving the image, and for example, to express depth perception using the omnidirectional image edition apparatus, shifting makes such as, e.g., a ground from a far side to a horizontal line, and a top of high building located near expressed in details without widening the viewing angle.

The stoke information includes drawing attributes and/or a drawing end flag or flags.

The drawing attributes included in the stroke information include, as an example that the drawing method is for a straight line, start point coordinates and end point coordinates (x: horizontal pixel, y: vertical pixel), color information (a: alpha, r: red, g: green, b: blue), and line width. Where a curve or freehand is expressed, it can be approximated using plural short straight lines.

The drawing end flag included in the stroke information is a flag for judging as to whether the drawing end processing is to be done (or namely, drawing the drawing images so far drawn to the omnidirectional image and clear the drawing images).

In the omnidirectional image edition apparatus, drawing is done in a state orienting some direction as a general rule. That is, the stroke information included in the reproduction sequence is relating to any of line-of-sight information, respectively.

Figure 4:
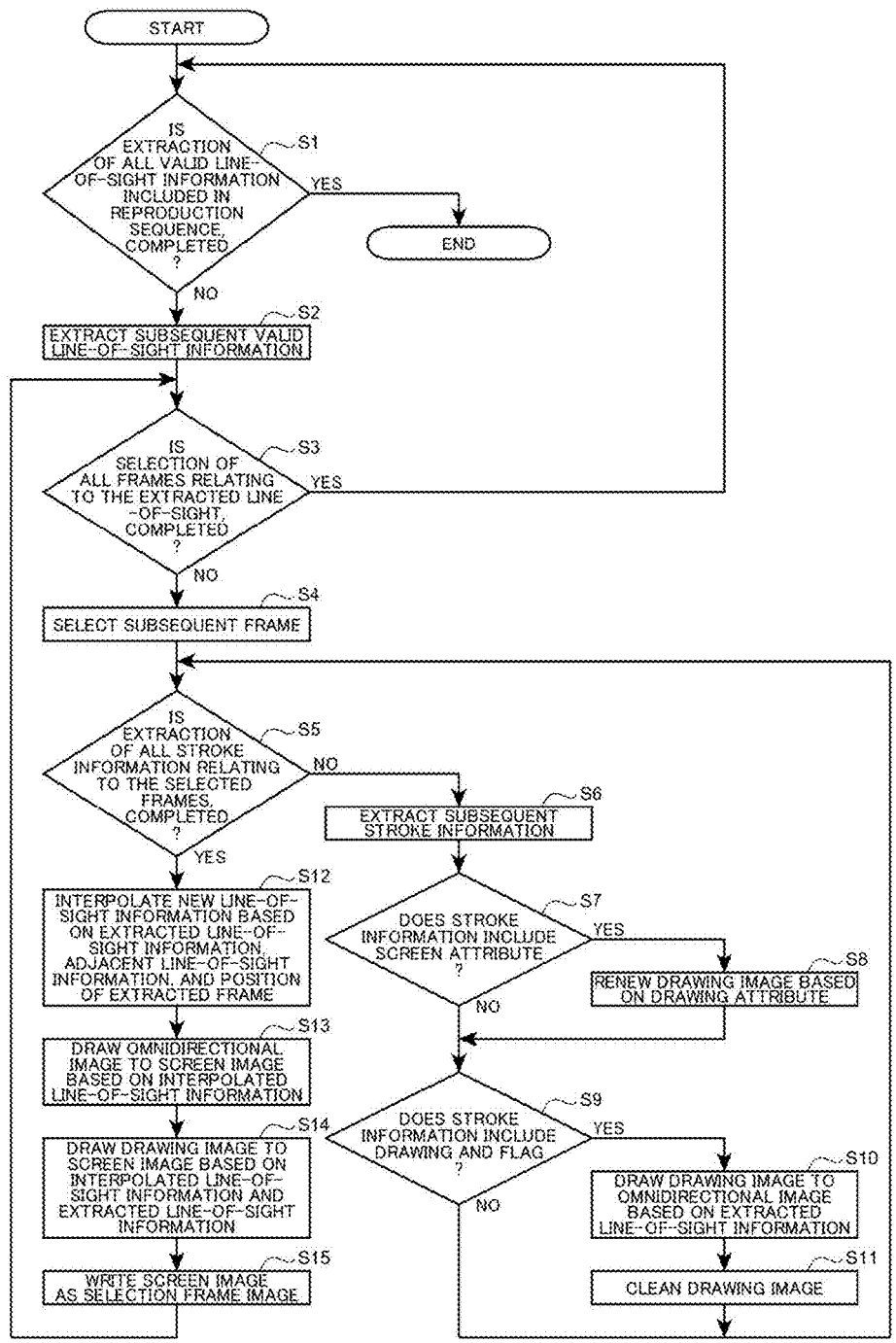
FIG. 4 is a flowchart showing a flow of the entire processing of the video generation program according to an embodiment of the invention.

Referring to FIG. 4, the flow of the entire processing of the video generation program according to the embodiment of the invention is described next.

It is to be noted that FIG. 4 exemplifies a case using the drawing image, and that the flow is divided into processing of renewing the drawing image and processing of renewing the omnidirectional image, after the stroke information is extracted. The processing of drawing to the screen image is also divided in substantially the same manner.

FIG. 4 does not include a concept of layers, but where a layer or layers are used, an attention is to be paid to such as, e.g., a sequence of drawing the omnidirectional image and the drawing image to the screen image.

If the processing starts, a judgment is first made as to whether extraction of the entire valid line-of-sight information included in the reproduction sequence is completed (at Step S1). Herein, the extraction is not yet completed, and the processing is branching off to "No," and a subsequent valid line-of-sight information is extracted (at Step S2).

Then, a judgment is made as to whether selection of the entire frames relating to the extracted line-of-sight information is completed (at Step S3). Herein, the selection is not yet completed, and the processing is branching off to "No," and a subsequent frame is selected (at Step S4).

Subsequently, a judgment is made as to whether extraction of the entire stroke information relating to the selected frame is completed (at Step S5). Here, if the extraction is not yet completed, the processing is branching off to "No," and subsequent stroke information is extracted (at Step S6). If no stroke information relating to the selected frame exists, the extraction is completed as it is, and the processing structure Step S5 is branching off to "Yes," and proceeds to Step S12.

A judgment is then made as to whether the stroke information includes drawing attribute (step S7). If it is included, the processing is branching off to "Yes," and the drawing image is renewed based on the drawing attribute (at Step S8), thereby proceeding to Step S9. To the contrary, if not included, the processing proceeds to Step S9 as it is.

Subsequently, a judgment is made as to whether the stroke information includes the drawing end flag (at Step S9). If it is included, the processing is branching off to "Yes," and the drawing image is drawn to the omnidirectional image based on the extracted line-of-sight information (at Step S10); the drawing image is cleared (at Step S11); the processing goes back to Step S5.

A judgment is made again as to whether extraction of the entire stroke information relating to the selected frame is completed (at Step S5). Here, if the extraction is completed, the processing is branching off to "Yes," and new line-of-sight information is interpolated based on the extracted line-of-sight information, adjacent line-of-sight information, and the position of the extracted frame (at Step S12); the omnidirectional image is drawn to the screen image based on the interpolated line-of-sight information (at Step S13); the drawing image is drawn to the screen image based on the interpolated line-of-sight information and the extracted line-of-sight information (at Step S14); the screen image is written as an image of the selected frame (at Step S15); the processing goes back to Step S3. It is to be noted that the term "written as an image of the selected frame" is meaning a processing generating images to be presented to viewers.

Then, a judgment is made again as to whether selection of the entire frames relating to the extracted line-of-sight information is completed (at Step S3). If it is judged as that the selection is completed, the processing is branching off to "Yes," and goes back to Step S1. A judgment is made again at Step S1 as to whether extraction of the entire valid line-of-sight information included in the reproduction sequence is completed (at Step S1), and if the extraction is not completed, the processing described above from Step S1 to Step S15 is repeated. If the extraction is completed, the processing ends.

Hereinafter, the processing is further described in detail.

FIG. 5 shows an example of a reproduction sequence, and describes the processing.

FIG. 5 is for an example of the reproduction sequence having forty two elements in total with numbers of 0 to 41. As kinds of the elements of the reproduction sequence, the line-of-sight information is indicated as "black square: ■"; the stroke information having the drawing attribute is indicated as "black triangle: ▲"; the stroke information having the drawing end flag is indicated as "white triangle: Δ".

To make explanations more easily understandable, it is presumed that the end of drawing is made immediately before change of the line-of-sight information as a rule of drawing in the omnidirectional image edition apparatus as the origin of the reproduction sequence in this example and examples subsequent.

FIG. 6 shows a concept in which the reproduction sequence described above is divided into groups.

This FIG. 6 shows one group as one row. The structure information having the drawing end flag comes an end of the group. It is to be noted that if a group having no line-of-sight information exists, the group may be coupled to the immediately previous group.

FIG. 7 shows a concept of correspondence of the reproduction sequence.

The correspondence is made to the reproduction sequence made into the groups as described above.

First, before making the correspondence to the data, the last line-of-sight information in the group is presumed as valid line-of-sight information for the groups having the line-of-sight information of the plural number exist. The line-of-sight information not presumed as valid is withdrawn. With this operation, the line-of-sight information of the respective groups can be used properly, and at the same time, the line-of-sight information having no related stroke information can be made unnecessary.

A concept of the correspondence of the data is shown. The line-of-sight information group is indicated as "V", and the line-of-sight information with a subscript "j" is indicated as V[j]. That is, the subscript of the line-of-sight information group V is also a group number. The stroke information group is indicated as "S", and the stroke information with a subscript "i" is indicated as S[i]. A stroke head position list relating to the line-of-sight information V[j] is indicated as "p"; the head position of the stroke information relating to the line-of-sight information V[j] is indicated as p[j]. That is, the head stroke information relating to the line-of-sight information V[j] having the subscript "j" is indicated as S[p[j]].

Herein, because the stroke information group relating to the line-of-sight information V[j] is made of respective stroke information with a subscript equal to or larger than p[j] and less than p[j+1] (that is, S[p[j]+0], S[p[j]+1], S[p[j]+2], . . . , S[p[j+1]−1]), the total number of the stroke information relating to line-of-sight information V[j] having the subscript "j" can be sought from p[j+1]−p[j].

The description above is an example of the correspondence of the reproduction sequence, but such correspondences can be made using another method as far as the single line-of-sight information and the stroke information group relating to this are made into groups. At that time, it is desirable to use a method suitable for the drawing rule in the omnidirectional image edition apparatus as the origin of the reproduction sequence.

Where a period for performing only looking-around is set upon temporarily stopping the reproduction of strokes, line-of-sight information having no related stroke information may be inserted in an arbitrary manner.

FIG. 8 shows an example arranging the reproduction sequence and the reproduction frame in the chronological order.

The example in FIG. 8 illustrates the line-of-sight information, the stroke information, the reproduction frame for video generation as described above, with relationship among them in the chronological order.

The line-of-sight information used for drawing is V[0] to V[3] based on the examples described above, four in total. The time between respective pairs of the line-of-sight information is set to an equal interval. An association of respective information data relating to one line-of-sight information is set to a group. For example, the group number relating to V[0] is set to 0. A boundary of the groups is set to around a center of two data of line-of-sight information adjacent to each other.

The reproduction frame number, for example, is set to 10 frames per one line-of-sight information or namely per one group, which is 40 frames in total. That is, the frame sequential numbers relating to V[0] are set to 0 to 9; the frame sequential numbers relating to V[1] are set to 10 to 19; the frame sequential numbers relating to V[2] are set to 20 to 29; the frame sequential numbers relating to V[3] are set to 30 to 39. The period of time between respective frames is set to an equal interval, and the time of the line-of-sight information is set to around the center of the frame groups relating thereto.

For example, the times of the respective frames (or namely, the frame sequential number 10 to 19) are adjusted so that the time of V[1] becomes the center of time between the frame sequential number 10 and the frame sequential number 20 (or namely, the frame sequential number 15). In this situation, the time of the frame sequential number 10 becomes the center time between V[0] and V[1]. Thus, it is desirable to set the frame numbers per one group (as well as the frame numbers between respective pairs of the line-of-sight information) to be a constant value. It is to be noted that the constant frame number may actually permit deviations of some frames (e.g., one or two frames), and where a video having 50 frames as a whole is made of four groups, the frame number of each group becomes 12 or 13.

The stroke information group of the respective groups are set to: based on the example described above, S[0] to S[4] as the stroke information group relating to V[0], five in total; S[5] to S[17] as the stroke information group relating to V[1], thirteen in total; S[18] to S[26] as the stroke information group relating to V[2], nine in total; S[27] to S[31] as the stroke information group relating to V[3], five in total. At that time, the contents of the stroke head position p are p[0]=0, p[1]=5, p[2]=18, p[3]=27, and p[4]=32. It is to be noted that a value of p[4] is made of addition of one to the last subscript (31) of the stroke information. That is, it is used for seeking the stroke information total number at the terminal end of data V[3].

The period of time between the respective stroke information is set to be the equal interval, and the time of the line-of-sight information is set to around the center of the stroke information group relating to this.

For example, the times of the respective stroke information S[0] to S[4] are adjusted so that the time of V[0] is set to the center of the time between S[0] and S[5].

It may be concerned that the numbers of the stroke information in the group may not be common in the entire groups. This means that the time between the stroke information does not have to be the equal interval through the whole, and that the reproduction speed of the stroke may not be the constant.

Images are generated with respect to each of the frames using the data described above.

The flow generating the image of the frame sequential number 13 is described herein as an example. It is presumed that the images of the frame sequential numbers 0 to 12 are already generated.

First, the stroke information (group) in a range after the time of immediately previous frame and equal to or less than the time of the present frame, or namely S[8] to S[9], is used to reflect the stroke to the omnidirectional image displayed on the frame and/or the drawing image.

The line-of-sight information at a time that the stroke is written (particularly, when the omnidirectional image is renewed) is V[1] because it is the line-of-sight information of the group that the frame sequential number 13 is relating (or namely, the group number 1).

The strokes using S[0] to S[7] are to be already reflected to the omnidirectional image and the drawing image in advance, and in addition to these, the strokes S[8] to S[9] are to be reflected.

Subsequently, new line-of-sight is sought to display the omnidirectional image and the drawing image at the frame. It is calculated with Catmull-Rom interpolation as one of interpolation methods for curving lines using four line-of-sight information whose time is close to the frame.

That is, Catmull Rom (V[−1], V[0], V[1], V[2], (10−5)/10) are calculated with respect to yaw angle, pitch angle, roll angle, and viewing angle, and are interpolated. Because V[−1] does not exist, Catmull Rom (V[0], V[0], V[1], V[2], (10−5)/10) are calculated using V[0] as the head of the data, instead. Using the interpolation method for curving line allows line-of-sight moving smoothly in a curving manner and can prevent line-of-sight from moving with abrupt direction changes.

The images of the frames are generated using the omnidirectional image, the drawing image, and the line-of-sight thus prepared.

Figure 9A:
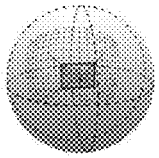
FIGS. 9A and 9B are tables showing video generation examples (states of drawing, states of video generation).
Figure 9B:

FIG. 9A and FIG. 9B show a video generation example (states of drawing and states of video generation).

The example described is shown more specifically. FIG. 9A and FIG. 9B are a video generation example where the plural rectangles are drawn in various directions. In this example, with the omnidirectional image edition apparatus, the drawer makes drawing of one rectangle in the front, three rectangles in facing downward directly, two rectangles in facing right side of the front, and one rectangle in the back.

The drawing methods are for all straight lines, and the four stroke information data having drawing attributes are used for one rectangle. One stroke information having the drawing end flag is used immediately before the move of the line-of-sight.

The generated video includes the line-of-sight smoothly moving as following sequentially the line-of-sight at the time of drawing (providing in excepting the withdrawn line-of-sight, and hereinafter, it is treated in the same way).

At the frame moving through the same line-of-sight as that at the time of drawing (e.g., frame sequential number 5), the stroke of the group including the line-of-sight information is completing around a half. The group is switched at the frame (e.g., frame sequential number 10) moving through around the center between the line-of-sight at the time of drawing and the subsequent line-of-sight, and the stroke of the subsequent group begins.

Herein, this invention includes the followings:

According to the first aspect of the invention, a video generation device is provided with a feature having: a main memory 12 as a memory unit for memorizing a video generation program (program data 50); and a central control unit 11 for making control, upon executing the video generation program memorized in the memory unit, to correspond a stroke information group to valid line-of-sight information from a reproduction sequence recording the line-of-sight information and the stroke information group, to render a frame number constant between a pair of line-of-sight information, and to reproduce, where the line-of-sight moves from a first line-of-sight via a second line-of-sight to a third line-of-sight, the stroke information group corresponding to the second line-of-sight in a range from a frame of a center between the first and second line-of-sight information to a frame of a center between the second and third line-of-sight information.

According to the second aspect of the invention, a video generation device is provided with a feature having: a main memory 12 as a memory unit for memorizing a video generation program (program data 50); and a central control unit 11 for making control to extract valid line-of-sight information included in a reproduction sequence upon executing the video generation program, to select a frame relating to the extracted line-of-sight information, to extract stroke information relating to the selected frame, to renew an omnidirectional image based on the line-of-sight information and drawing attribute where the stroke information includes the drawing attribute, to generate new line-of-sight information in an interpolated manner based on the extracted line-of-sight information, adjacent line-of-sight information, and the position of the extracted frame, upon completion of extraction of the entire stroke information relating to the selected frame, to make drawing the omnidirectional image on a screen image based on the interpolated line-of-sight information, and to write the screen image as an image of the selected frame.

According to the third aspect of the invention, a video generation program is provided with a feature making a computer 10 functioning as a central control unit 11 controlling, where executing the video generation program (program data 50) memorized in a main memory 12 as a memory unit, to correspond a stroke information group to valid line-of-sight information from a reproduction sequence recording the line-of-sight information and the stroke information group, to render a frame number constant between a pair of line-of-sight information, and to reproduce, where the line-of-sight moves from a first line-of-sight via a second line-of-sight to a third line-of-sight, the stroke information group corresponding to the second line-of-sight in a range from a frame of a center between the first and second line-of-sight information to a frame of a center between the second and third line-of-sight information.

According to the fourth aspect of the invention, a video generation program is provided with a feature making a computer 10 functioning as a central control unit 11 controlling to execute, as a step of executing the video generation program (program data 50) memorized in a main memory 12 as a memory unit, the steps of: extracting valid line-of-sight information included in a reproduction sequence upon executing the video generation program; selecting a frame relating to the extracted line-of-sight information, to extract stroke information relating to the selected frame; renewing an omnidirectional image based on the line-of-sight information and drawing attribute where the stroke information includes the drawing attribute; generating new line-of-sight information in an interpolated manner based on the extracted line-of-sight information, adjacent line-of-sight information, and the position of the extracted frame, upon completion of extraction of the entire stroke information relating to the selected frame; making drawing the omnidirectional image on a screen image based on the interpolated line-of-sight information; and writing the screen image as an image of the selected frame.

According to the fifth aspect of the invention, a video generation method is provided with a feature rendering a central control unit 11 execute a video generation program (program data 50) memorized in a main memory 12 as a memory unit, to correspond a stroke information group to valid line-of-sight information from a reproduction sequence recording the line-of-sight information and the stroke information group, to render a frame number constant between a pair of line-of-sight information, and to reproduce, where the line-of-sight moves from a first line-of-sight via a second line-of-sight to a third line-of-sight, the stroke information group corresponding to the second line-of-sight in a range from a frame of a center between the first and second line-of-sight information to a frame of a center between the second and third line-of-sight information.

According to the sixth aspect of the invention, a video generation method is provided with a feature rendering a central control unit 11 execute a video generation program (program data 50) memorized in a main memory 12 as a memory unit as a step, for executing the steps of: extracting valid line-of-sight information included in a reproduction sequence upon executing the video generation program; selecting a frame relating to the extracted line-of-sight information, to extract stroke information relating to the selected frame; renewing an omnidirectional image based on the line-of-sight information and drawing attribute where the stroke information includes the drawing attribute; generating new line-of-sight information in an interpolated manner based on the extracted line-of-sight information, adjacent line-of-sight information, and the position of the extracted frame, upon completion of extraction of the entire stroke information relating to the selected frame; making drawing the omnidirectional image on a screen image based on the interpolated line-of-sight information; and writing the screen image as an image of the selected frame.

As described above, this invention allows the states of brush strokes to be displayed in an easily understandable manner because of the video generation observing states of renewal of the omnidirectional image (or namely state of strokes) with high probability.

This invention further automatically generates a video utilizing the data recording the manipulations done by the drawer, so that work load for video generation can be reduced.

As described above, the reproduction speed of the stroke is not always constant. It is however considered that the change of the reproduction speed of the stroke does not much affect the immersion feeling as than the change of moving speed of line-of-sight. That is, according to the invention, by permitting changes of the reproduction speed of the strokes, smooth move of the line-of-sight is made possible, and an effect holding immersion feeling effectively from looking-around can be expected.

Description of Reference Numbers

1 Video Generation Device,
10 Personal Computer,
11 Central Control Unit,
12 Main Memory,
13 Image Control Unit
13a Video Memory
14 Input Output Control Unit
15 Built-in Nonvolatile Recording Medium
16 Medium Reading Writing Interface
20 Display Device
30 Video Parameter Input Device
40 Sequence Input Data
41 Looking-Around Video Output Data
42 Direction and Pixel Corresponding Data
50 Program Data

What is claimed is:

1. A video generation device comprising:
a memory storing a video generation program; and
a central control unit for performing a control to extract multiple occurrences of valid line-of-sight information included in a reproduction sequence upon executing the video generation program, to select a plurality of frames relating to the multiple occurrences of line-of-sight information, so that a constant number of frames will exist between a pair of the occurrences of line-of-sight information, to extract multiple occurrences of stroke information relating to the selected frames in a number adjusted so as to keep constant the number of frames between the pair of occurrences of line-of-sight information, to renew an omnidirectional image based on the line-of-sight information and drawing attribute where the stroke information includes the drawing attribute, to generate new line-of-sight information in an interpolated manner based on the extracted line-of-sight information, adjacent line-of-sight information, and the position of the extracted frame, upon completion of extraction of the entire stroke information relating to the selected frame, to make drawing the omnidirectional image on a screen image based on the interpolated line-of-sight information, and to write the screen image as an image of the selected frame.

2. The video generation device according to claim 1, wherein the reproduction sequence includes the line-of-sight information and the stroke information, wherein the line-of-sight information includes information of line-of-sight angle and viewing angle, and wherein the stroke information includes the drawing attribute.

3. The video generation device according to claim 2, wherein the drawing attribute includes at least one of start point coordinates, end point coordinates, color information, and line width information.

4. The video generation device according to claim 3, wherein the stroke information includes a drawing end flag, and wherein the central control unit renews the drawing image based the drawing attribute where the stroke information includes the drawing attribute, and draws the drawing image on the omnidirectional image based on the line-of-sight information where the stroke information includes the drawing end flag, and draws the drawing image on the screen image based on the interpolated line-of-sight information and the extracted line-of-sight information.

5. The video generation device according to claim 2, wherein the stroke information includes a drawing end flag, and wherein the central control unit renews the drawing image based the drawing attribute where the stroke information includes the drawing attribute, and draws the drawing image on the omnidirectional image based on the line-of-sight information where the stroke information includes the drawing end flag, and draws the drawing image on the screen image based on the interpolated line-of-sight information and the extracted line-of-sight information.

6. The video generation device according to claim 1, wherein the stroke information includes a drawing end flag, and wherein the central control unit renews the drawing image based the drawing attribute where the stroke information includes the drawing attribute, and makes drawing of the drawing image to the omnidirectional image based on the line-of-sight information where the stroke information includes the drawing end flag, and makes drawing of the drawing image to the screen image based on the interpolated line-of-sight information and the extracted line-of-sight information.

7. A non-transitory recording medium in which a video generation program is recorded, execution of the video generation program by a computer making the computer to function as a central control unit to execute, the steps of:
extracting multiple occurrences of valid line-of-sight information included in a reproduction sequence upon executing the video generation program;
selecting a plurality of frames relating to the extracted multiple occurrences of line-of-sight information so that a constant number of frames exists between a pair of the occurrences of the line-of-sight information;
extracting multiple occurrences of stroke information relating to the selected frames in a number adjusted so as to keep constant the number of frames between the pair of occurrences of line-of-sight information;

renewing an omnidirectional image based on the line-of-sight information and drawing attribute where the stroke information includes the drawing attribute;

generating new line-of-sight information in an interpolated manner based on the extracted line-of-sight information, adjacent line-of-sight information, and the position of the extracted frame, upon completion of extraction of the entire stroke information relating to the selected frame;

drawing the omnidirectional image on a screen image based on the interpolated line-of-sight information; and writing the screen image as an image of the selected frame.

8. The recording medium according to claim 7, wherein the reproduction sequence includes the line-of-sight information and the stroke information, wherein the line-of-sight information includes information of line-of-sight angle and viewing angle, and wherein the stroke information includes the drawing attribute.

9. The recording medium according to claim 8, wherein the drawing attribute includes at least one of start point coordinates, end point coordinates, color information, and line width information.

10. The recording medium according to claim 9, wherein the stroke information includes a drawing end flag, and wherein the executing the video generation program includes causing the central control unit to renew the drawing image based the drawing attribute where the stroke information includes the drawing attribute, and to draw the drawing image on the omnidirectional image based on the line-of-sight information where the stroke information includes the drawing end flag, and to draw the drawing image on the screen image based on the interpolated line-of-sight information and the extracted line-of-sight information.

11. The recording medium according to claim 8, wherein the stroke information includes a drawing end flag, and wherein the executing the video generation program includes causing the central control unit to renew the drawing image based the drawing attribute where the stroke information includes the drawing attribute, and to draw the drawing image on the omnidirectional image based on the line-of-sight information where the stroke information includes the drawing end flag, and to draw the drawing image on the screen image based on the interpolated line-of-sight information and the extracted line-of-sight information.

12. The recording medium according to claim 7,
wherein the stroke information includes a drawing end flag, and
wherein the executing the video generation program includes causing the central control unit to renew the drawing image based the drawing attribute where the stroke information includes the drawing attribute, and to draw the drawing image on the omnidirectional image based on the line-of-sight information where the stroke information includes the drawing end flag, and to draw the drawing image on the screen image based on the interpolated line-of-sight information and the extracted line-of-sight information.

13. A video generation method, to be performed by a central control unit of a video generation device via execution of a video generation program stored in a memory unit comprising:

extracting multiple occurrences of line-of-sight information included in a reproduction sequence;

selecting a plurality of frames relating to the extracted multiple occurrences of line-of-sight information so that a constant number of frames exists between a pair of the occurrences of the line-of-sight information;

extracting multiple occurrences of stroke information relating to the selected frames in a number adjusted so as to keep constant the number of frames between the pair of occurrences of line-of-sight information;

renewing an omnidirectional image based on the line-of-sight information and drawing attribute where one of the occurrences of the stroke information includes the drawing attribute;

generating new line-of-sight information in an interpolated manner based on the extracted line-of-sight information, line-of-sight information adjacent thereto, and the position of each selected frame, upon completion of extraction of the entire stroke information relating to said each selected frame;

drawing the omnidirectional image on a screen image based on the interpolated line-of-sight information; and writing the screen image as an image of the selected frames.

14. The video generation method according to claim 13, wherein the reproduction sequence includes the line-of-sight information and the stroke information, wherein the line-of-sight information includes information of line-of-sight angle and viewing angle, and wherein the stroke information includes the drawing attribute.

15. The video generation method according to claim 14, wherein the drawing attribute includes at least one of start point coordinates, end point coordinates, color information, and line width information.

16. The video generation method according to claim 14,
wherein the stroke information includes a drawing end flag, and
wherein the executing the video generation program includes causing the central control unit to
renew the drawing image based the drawing attribute where the stroke information includes the drawing attribute,
draw the drawing image on the omnidirectional image based on the line-of-sight information where the stroke information includes the drawing end flag, and
draw the drawing image on the screen image based on the interpolated line-of-sight information and the extracted line-of-sight information.

17. The video generation method according to claim 13, wherein the stroke information includes a drawing end flag, and
wherein execution of the video generation program causes the central control unit to renew the drawing image based the drawing attribute where the stroke information includes the drawing attribute, and to draw the drawing image on the omnidirectional image based on the line-of-sight information where the stroke information includes the drawing end flag, and to draw the drawing image on the screen image based on the interpolated line-of-sight information and the extracted line-of-sight information.

* * * * *